Patented Dec. 19, 1939

2,183,602

UNITED STATES PATENT OFFICE 2,183,602

FABRICATING VINYLIDENE CHLORIDE POLYMERS

Ralph M. Wiley, Midland, Mich., assignor to The Dow Chemical Company, Midland, Mich., a corporation of Michigan No Drawing. Application September 4, 1937, Serial No. 162,553

4 Claims. (Cl. 18—55)

This invention relates to a method of treating polymerized vinylidene chloride and co-polymers thereof with other polymerizable materials prior to cold-working the same, and to the products obtained by such method.

Polymerized vinylidene chloride can be deformed plastically at ordinary molding temperatures, e. g. 150°–170° C., only by the use of very high pressures and then only to produce simple forms where little plastic flow is required. Certain co-polymers of vinylidene chloride with other polymerizable materials are also extremely difficult to cold-work, i. e. to draw, extrude, mold, etc., at or about room temperature, even though in some instances considerably less pressure is required to accomplish plastic deformation of the co-polymers than when dealing with polymerized vinylidene chloride itself. It is therefore desirable to provide a procedure whereby such materials can be fabricated into shaped articles by cold-working methods, and without resorting to the high pressures heretofore required.

I have now found that vinylidene chloride and certain of its co-polymers, particularly those in which vinylidene chloride is polymerized together with vinyl chloride, styrene, and/or vinyl esters of organic acids, such as vinyl acetate, can be so treated after they are formed that they can be cold-worked without the application of high pressures. The method comprises heating the polymer or co-polymer to a temperature substantially above the softening point thereof, but preferably below the decomposition temperature of such resinous material (satisfactory temperatures are ordinarily in the range from about 150° to 250° C.) for such a period of time that the material becomes very plastic, and then chilling the product rapidly, e. g. within 2 to 60 seconds, to a temperature suitably near room temperature, whereby a super-cooled form of the polymer or co-polymer is obtained. This super-cooled polymeric body retains an excellent degree of plasticity for from 2 to 60 minutes or longer, depending upon the nature of the polymer therein, and during this period can be cold-worked readily.

After a period of about 2 minutes a super-cooled polymeric derivative of vinylidene chloride begins to exhibit a gradual decrease in plasticity and ultimately becomes relatively non-plastic again. Such products still have somewhat greater plasticity than do untreated samples of polymerized vinylidene chloride, but cannot ordinarily be readily cold-worked without again heating the material to a temperature above its softening point and chilling to produce a super-cooled polymer. It is desirable, then, to carry out fabrication operations on the super-cooled product almost immediately after chilling the same from the elevated temperature to which it was subjected.

The following examples illustrate the practice of my invention:

Example 1

A sheet of polymerized vinylidene chloride approximately $\frac{1}{32}$ inch thick was heated to about 220° C., i. e. to about 30 degrees above its softening point, for a period of approximately 2 minutes, and then suddenly chilled to room temperature in the course of from 2 to 3 seconds, suitably by immersion in cold water. In the super-cooled condition in which it was thus obtained, the polymeric vinylidene chloride was deformed plastically at pressures as low as 1000 pounds per square inch when it was desired to produce shaped articles requiring considerable plastic flow, and could be drawn, extruded, or pressed into any desired shape. The vinylidene chloride polymer was found to remain in the super-cooled condition and to be readily workable for from 2 to 3 minutes. By way of contrast with the results herein set forth, polymerized vinylidene chloride as obtained immediately after polymerization and without super-cooling required pressures as high as 20,000 pounds per square inch to accomplish sufficient deformation to produce simple molded forms, even at temperatures commonly employed in molding synthetic resins, i. e. up to about 160° C.

Example 2

A co-polymer prepared by polymerizing together a mixture composed of 70 parts of vinylidene chloride and 30 parts of vinyl chloride, by weight, at a temperature of about 30° C., was heated to 160° C. until considerable placticity was evidenced and then chilled in the course of about 60 seconds to room temperature. The super-cooled product so obtained was found to retain its property of being easily deformable for about 30 minutes. Prior to treatment such a product was capable of little elongation, whereas the super-cooled product, when tested in the form of a filament $\frac{1}{16}$ inch in diameter, was found to elongate to approximately 400 per cent of its original length. After about 30 minutes the material no longer exhibited such marked plastic characteristics, and although it could be temporarily deformed owing to its elasticity, it exhibited no plastic flow except when subjected to high temperatures and/or extreme pressures.

Example 3

A co-polymer prepared by polymerizing 70 parts of vinylidene chloride with 30 parts of vinyl acetate, by weight, gave results which were similar to those obtained in the experiment described in Example 2.

Example 4

A co-polymer prepared by polymerizing together 94 parts of vinylidine chloride and 6 parts of styrene, by weight, was heated to about 190° C., i. e. to a temperature about 20 to 30 degrees above its softening point, for a period of about 5 minutes, which was sufficient to convert the material to a plastic state throughout its entire mass. It was then chilled in about 30 seconds to a temperature between about 25° and about 30° C. The super-cooled bar was capable of elongation to approximately twice its original length and had a tensile strength more than 3 times as great as that of a bar made from the same material and not subjected to the super-cooling treatment. The super-cooled sample of this material was capable of being cold-worked, e. g. extruded, rolled, or molded, for about 15 minutes after having been chilled. It was thereafter very tough and highly resistant to deformation.

Example 5

A co-polymer of vinylidene chloride with 5 per cent by weight of ethyl acrylate was heated at 190° C. for about 60 seconds and then in the course of about 20 seconds was chilled to room temperature. The so formed super-cooled co-polymer was readily cold-workable for a rather brief period of about 1 minute.

Products made by cold-working the super-cooled forms of polymeric or co-polymeric vinylidene chloride products have an extremely high tensile strength and are very tough. It is also possible to produce a tough vinylidene chloride polymeric product by subjecting the polymer to elevated temperatures and then allowing the material to cool slowly, but such products are not ordinarily as readily deformable and are not as tough as those obtained by rapidly chilling and then cold-working the polymeric bodies in accordance with the process hereinbefore described.

I have found the present process to be applicable to polymers and co-polymers of vinylidene chloride containing plasticizers, coloring agents, fillers, heat-stabilizing agents, and the like. To illustrate, a number of test rods were prepared from a molding power consisting of polymeric vinylidene chloride plasticized with about 30 per cent by weight of hexachloro-diphenyl oxide. The test rods were molded at about 160° C. When allowed to cool gradually to room temperature, these rods were found to be capable of elongation to the extent of about 10 per cent of their original length, when subjected to tension, and had a tensile strength of approximately 5000 pounds per square inch of original cross section. A few of the rods were heated to 210° C. for a sufficient period to allow their entire mass to come to this temperature and were then chilled to room temperature by being immersed in cold water. While still in the super-cooled state they were cold-drawn to about 4 times their original length, and, after standing, were found to have tensile strengths averaging about 16,000 pounds per square inch of cross section in the drawn form and were not capable of further plastic elongation. When some of the super-cooled test rods were allowed to stand at room temperature for about an hour, they were found to be very tough and highly resistant to deformation in any of the several cold-working operations.

The new process is applicable to the production of tough films, molded articles, and the like, from polymers and co-polymers of vinylidene chloride, but is especially adapted to the production from such materials of tough threads and filaments capable of being advantageously employed for a variety of purposes, especially where the characteristic resistance of polymeric vinylidene chloride to attack by chemical reagents is desired.

The present toughening process is applicable to the treatment of pre-shaped articles made from vinylidene chloride polymers, and converts such articles into more usable products than when they are first shaped from the polymer.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:

1. The method which includes heating a body of a material selected from the group consisting of polymeric vinylidene chloride and co-polymers thereof which contain vinylidene chloride as the major component, to a temperature between its softening point and its decomposition temperature, rapidly chilling to super-cool the same, and subjecting the super-cooled polymeric product to plastic deformation.

2. The method which comprises heating polymeric vinylidene chloride to a temperature between its softening point and its decomposition temperature for a period of time sufficient to heat the polymer uniformly throughout, thereafter rapidly chilling the same to obtain a super-cooled form of said polymer, and subjecting the polymer to plastic deformation while in the super-cooled state.

3. The method which comprises heating a co-polymer of vinylidene chloride wherein vinylidene chloride is the major component to a temperature between the softening point thereof and its decomposition temperature, rapidly chilling the same to obtain a super-cooled form of said co-polymer, and subjecting the co-polymer to plastic deformation while in the super-cooled state.

4. The method which includes heating a solidified body containing a material selected from the group consisting of polymeric vinylidene chloride and co-polymers thereof which contain vinylidene chloride as the major component and containing a material selected from the group consisting of plasticizers and heat-stabilizing agents, to a temperature between its softening point and its decomposition temperature, rapidly chilling to super-cool the same, and subjecting the super-cooled product to plastic deformation.

RALPH M. WILEY.